United States Patent [19]

Kuwayama et al.

[11] Patent Number: 5,665,485

[45] Date of Patent: Sep. 9, 1997

[54] SPLASHPROOF CONSTRUCTION FOR PORTABLE TYPE ELECTRONIC DEVICE

[75] Inventors: Tatsuo Kuwayama; Isamu Sekine; Tatsuya Okawa; Takeshi Sato; Ryuichi Takahashi, all of Tokyo, Japan

[73] Assignee: Kokusai Electric Co., Ltd., Japan

[21] Appl. No.: 459,830

[22] Filed: Jun. 2, 1995

[30] Foreign Application Priority Data

| Jun. 3, 1994 | [JP] | Japan | 6-145413 |
| Jun. 3, 1994 | [JP] | Japan | 6-145417 |
| Jun. 3, 1994 | [JP] | Japan | 6-145418 |
| Jun. 3, 1994 | [JP] | Japan | 6-145419 |

[51] Int. Cl.$^6$ ............................................ H01M 2/10
[52] U.S. Cl. .................... 429/100; 174/52.3; 429/185
[58] Field of Search ........................ 200/302.1, 303, 200/304, 294, 333; 174/50.5, 50.51, 50.52, 17 R, 17 CT, 17.05, 52.1, 52.3, 61; 439/205, 206, 500, 278, 281, 519, 587; 429/96, 99, 100, 123, 185; 379/428, 433, 434, 455; 277/12, 36, 37, 50; 455/89, 90

[56] References Cited

U.S. PATENT DOCUMENTS

| 2,439,408 | 4/1948 | Mitchell | 455/89 |
| 4,912,602 | 3/1990 | Zurek et al. | 455/90 |
| 5,436,088 | 7/1995 | Castaneda et al. | 429/96 |
| 5,505,635 | 4/1996 | Willows et al. | 439/500 |

*Primary Examiner*—Renee S. Luebke
*Attorney, Agent, or Firm*—Graham & James LLP

[57] ABSTRACT

A splashproof construction for a portable electronic device, comprising an electronic device main unit, and a battery pack to be mounted on the electronic device main unit, whereby one of either the electronic device main unit or the battery pack has a boundary surface formed along a combined surface and a peripheral edge and with a graded step with respect to the combined surface, and a guide rail provided adjacent to the boundary surface, and the other of either the electronic device main unit or the battery pack has a peripheral wall aligned with the boundary surface and a guide groove to be slidably engaged with the guide rail, or a bottom wall of the peripheral wall has a notch abutting on a lower surface of the graded step on the boundary surface, or a water-repellent sheet is provided at the bottom of the guide groove, or a seal plate made of a highly elastic material is provided either on an end surface of the battery pack abutted on the electronic device main unit at an end point of sliding when the battery pack is slid and mounted or on an abutment surface of the electronic device main unit in contact with the end surface.

7 Claims, 4 Drawing Sheets

1

SPLASHPROOF CONSTRUCTION FOR PORTABLE TYPE ELECTRONIC DEVICE

BACKGROUND OF THE INVENTION

The present invention relates to a splashproof construction for a portable type electronic device.

In a portable type electronic device, electric power is supplied from a battery pack, which is removably mounted on a main unit of the device. In the portable type electronic devices used so far, no consideration has been given off the use of the devices in the outdoor applications when it is raining, and there has been no adequate sealing means between the removable battery pack and the main unit of the device. In particular, when a removable unit is mounted on the main unit of the device, a plane contact portion is structurally present between the removable unit such as the battery pack and the main unit of the device, while there has been no adequate means for plane sealing to make the plane contact portion easily and conveniently removable. In a portable type electronic device using a nickel-hydrogen battery pack, it is not possible to closely seal the nickel-hydrogen battery pack because hydrogen gas is generated in charging. Therefore, no special consideration has been given to the sealing between the main unit of the portable type electronic device and the battery pack in the conventional type portable electronic devices, and such devices are not designed in the splashproof construction.

With the diversification of the demands of the users in recent years, a splashproof function is now required for the portable electronic devices so that the devices can be used conveniently in the outdoor applications even when it is raining.

SUMMARY OF THE INVENTION

It is an object of the present invention to provide a splashproof construction for adequately sealing between a removable battery pack and a main unit of a device, whereby the device can be used in the outdoor applications even when it is raining and a nickel-hydrogen battery pack can be mounted on ft. The splashproof construction for a portable type electronic device according to the present invention comprises an electronic device main unit, and a battery pack to be mounted on the electronic device main unit, whereby one of either the electronic device main unit or the battery pack has a boundary surface formed along a combined surface and a peripheral edge and with a graded step with respect to the combined surface, and a guide rail provided adjacent to the boundary surface, and the other of either the electronic device main unit or the battery pack has a peripheral wall aligned with the boundary surface and a guide groove to be slidably engaged with the guide rail, or a bottom wall of the peripheral wall has a notch abutting on a lower surface of the graded step on the boundary surface or a water-repellent sheet is provided at the bottom of the guide groove, or a seal plate made of a highly elastic material is provided either on an end surface of the battery pack abutted on the electronic device main unit at an end point of sliding when the battery pack is slid and mounted or on an abutment surface of the electronic device main unit in contact with the end surface, or a graded step formed by raising the portion of the seal plate along a sealing line up to a given amount.

DETAILED DESCRIPTION OF THE PREFERRED EMBODIMENT

In the following, description will be given for an embodiment of the present invention in connection with the drawings.

Figure 1:
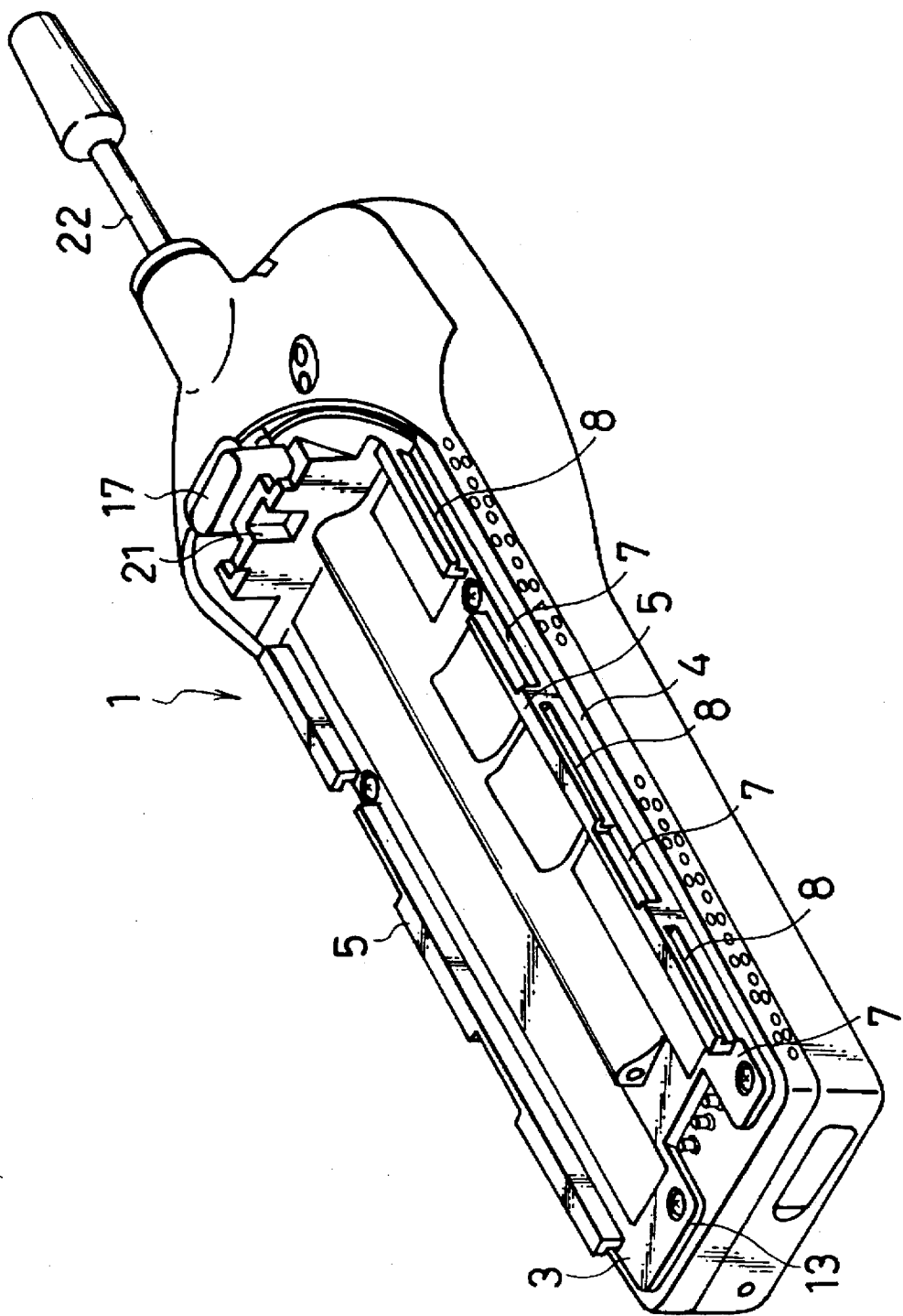
FIG. 1 is a perspective view of a telephone main unit of a portable telephone set provided with a construction of the present invention.
Figure 2:
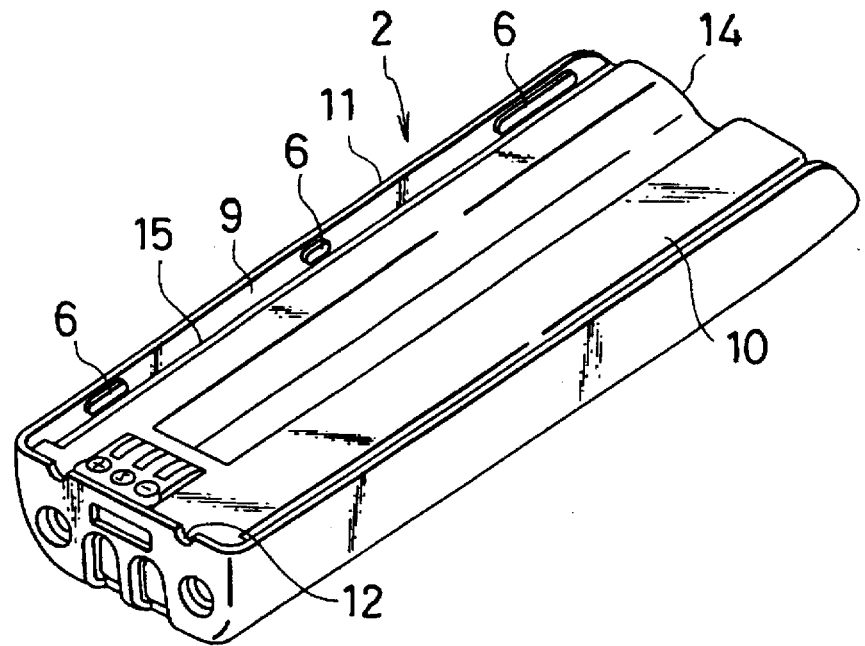
FIG. 2 is a perspective view of a battery pack for a portable telephone provided with a construction of the present invention.
Figure 3:
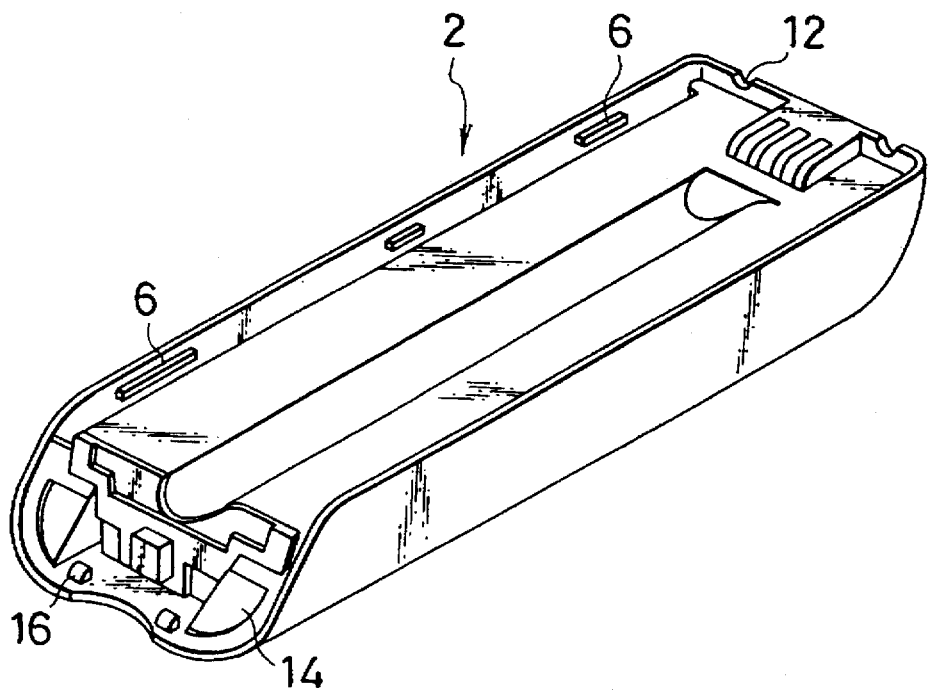
FIG. 3 is a perspective view of a battery pack for a portable telephone provided with a construction of the present invention.
Figure 4:
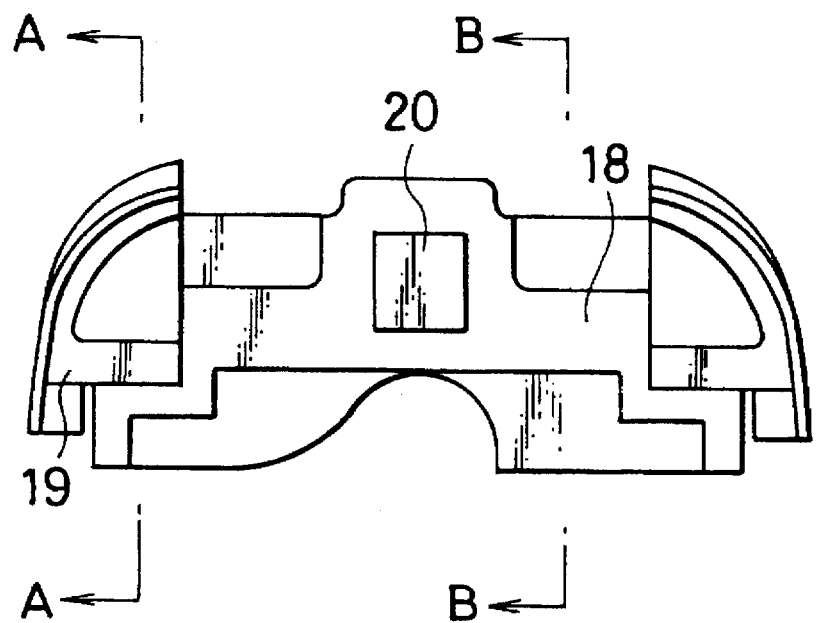
FIG. 4 is a front view of a seal plate and battery pack with a construction of the present invention.
Figure 5:
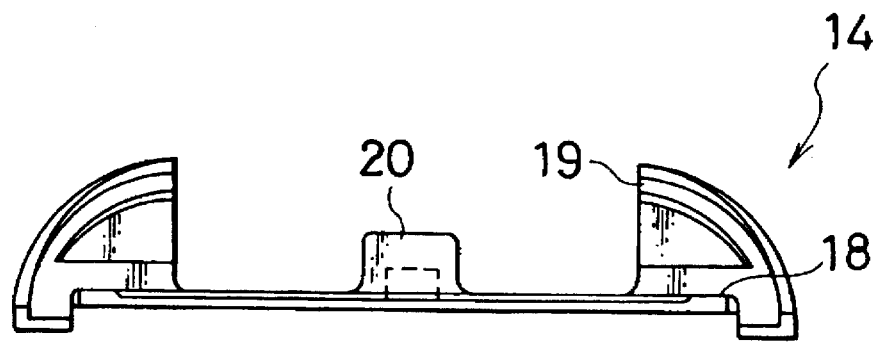
FIG. 5 is a plan view seen from bottom of the above seal plate.
Figure 6:
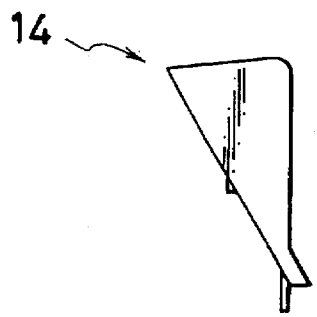
FIG. 6 is a side view of the above seal plate.
Figure 7:
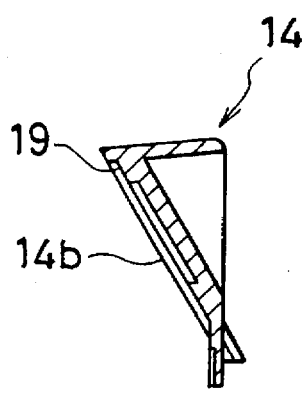
FIG. 7 is a section diagram along the line A—A of FIG. 4.
Figure 8:
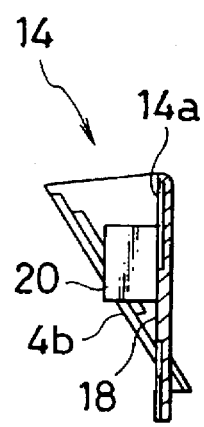
FIG. 8 is a section diagram along the line B—B of FIG. 4.

In FIG. 1, reference numeral 1 represents a main telephone unit of a portable telephone, which is one of a exam portable electronic devices. In FIG. 2 and FIG. 3, reference numeral 2 represents a battery pack mounted on the main telephone unit. Description is given for the case where the construction of the present invention is applied on a portable telephone.

A combined surface 3 of the main telephone unit 1 with the battery pack 2 has a graded step 13 from a boundary surface 4 between the telephone main unit 1 and the battery pack 2 (a surface including the borderline on the surface of the portable telephone set when the battery pack 2 is mounted on the telephone main unit 1), and a guide rail 5 is arranged on a border between the combined surface 3 and the boundary surface 4. The guide rail 5 is designed continuous almost over the entire length in vertical direction of the combined surface 3 except a notch near the top where an antenna 22 is protruded, and a splashproof wall facing to the boundary surface 4 is formed.

On the guide rail 5, there are provided a space 7 for receiving an engaging projection 6 of the battery pack 2 as described later and an engaging groove 8 continuous to the space 7 and extending in parallel to the boundary surface 4.

On both sides of the battery pack 2, a guide groove 9 is formed, with which the guide rail 5 is to be engaged. On the peripheral edge of the battery pack 2, a peripheral wall 11 is provided, which has a height to match the graded step 13 on the combined surface 3 from a combined surface 10 which is in contact with the combined surface 3 of the telephone main unit 1. The peripheral wall 11 is aligned with the boundary surface 4, and the engaging projection 6 is protruded on a side wall facing the guide groove 9. A semicircular notch 12 is formed on a bottom wall of the peripheral wall 11 which would abut the graded step 13 between the boundary surface and the combined surface 3. When the battery pack 2 is mounted on the telephone main unit 1, the notch 12 is blocked by the graded step 13.

On the upper end surface of the battery pack 2, a seal plate 14 is attached and it is made of a highly elastic material such as silicone rubber, urethane rubber, plastic elastomer, butyl rubber, etc.. On the bottom of the guide groove 9, a water-repellent sheet is attached and it is made of a water-repellent fiber cloth or a non-woven fabric cloth impregnated with water-repellent material.

Description is now given on the seal plate 14, referring to FIG. 4 to FIG. 8.

The upper end surface of the battery pack 2 consists of a vertical surface and an inclined surface, and the seal plate 14 has a vertical surface 14a and an inclined surface 14b to perfectly fit to the upper end surface of the battery pack 2. Further, sealing property depends on sealing pressure, and the seal plate 14 is designed in such shape that the sealing pressure is maintained at a desired value and the seal plate 14 is adequately deformed.

Specifically, the seal plate 14 includes a sealing portion 18 peripheral edge 19. When the battery pack 2 is mounted on the telephone main unit 1 and the upper end surface of the battery pack 2 is abutted on the abutment surface of the telephone main unit 1, the sealing portion 18 and the peripheral edge 19 are brought into contact with the abutment surface of the main unit, and the sealing pressure is maintained at a desired value.

Approximately at the center of the seal plate 14, a projection 20 is provided, and the projection 20 is engaged in a recess 21 formed on the abutment surface of the telephone main unit 1 and blocks the recess.

In FIG. 3, reference numeral 16 represents an engaging pawl to be engaged with a hook (not shown) on the telephone main unit 1. Reference numeral 17 in FIG. 1 is a release button to release the engagement between the hook and the engaging pawl 16.

In case the battery pack 2 in FIG. 2 is mounted on the telephone main unit 1 in FIG. 1, the engaging projection 6 is brought into the space 7, and the telephone main unit 1 and the battery pack 2 are closely fitted to each other, and the battery pack 2 is slid upward. The engaging projection 6 is engaged and slid into the engaging groove 8, and the engaging pawl 16 is engaged with the hook (not shown), and thus the battery pack 2 is fixed on and combined with the telephone main unit 1. As described above, the notch 12 is brought into contact with the graded step 13 on the telephone main unit 1 and is blocked by the graded step 13.

Between the upper end surface of the battery pack 2 and the abutted surface of the telephone main unit 1, the seal plate 14 is present. By engaging the pawl 16 with the hook (not shown), the sealing portion 18 and the peripheral edge 19 are deformed by predetermined amount. The upper end surface of the battery pack 2 and the abutted surface of the telephone main unit 1 are closely fitted to each other, and rattling of the battery pack 2 is eliminated by the restoring force of the seal plate 14. Further, because the sealing portion 18 and the peripheral edge 19 are formed and the area of abutment is limited, sufficient sealing effect can be provided without requiring strong fixing means such as screwing.

Between the upper surface of the guide rail 5 and the bottom of the guide groove 9, the water-repellent sheet 15 is present. This water-repellent sheet 15 allows smooth sliding movement of the battery pack 2 with respect to the telephone main unit 1 and prevents intrusion of water through gaps between the guide rail 5 and the water-repellent sheet 15.

The intrusion of water beyond the graded step 13 through the boundary surface 4 between the telephone main unit 1 and the battery back 2 is prevented by the graded step 13 between the combined surface 3 and the boundary surface 4 and also by the guide rail 5, the seal plate 14, and the water-repellent sheet 15. Further, the infiltrated water flows along the boundary surface 4 and seeps through the notch 12, and it does not enter inside beyond the graded step 13 of the combined surface 3.

Because the guide rail 5 is substantially continuous it serves as a splashproof wall. Although the upper portion of the guide rail is partially chipped out, the present inventors have found by experiments that its function as a splashproof wall is not impaired. Therefore, there is no need to use fastening means such as bolts in sealing the sliding portion, and the battery pack can be removed freely.

When the battery pack 2 is mounted on the telephone main unit 1 and the battery pack 2 is continuously fast charged after it has been already completely charged, gas may be generated, but the generated gas passes through small gaps between the boundary surface 4 and the peripheral wall 11 and is dispersed through the notch 12 to outside.

When gas is generated from the battery pack 2, the construction of the present invention fulfills splashproof function while dispersing gas out of the portable electronic device.

It is needless to say that the sealing portion 18 and the peripheral edge 19 can be provided not only on the peripheral edge of the seal plate 14 but also on the boundary portion to be sealed. Also, it goes without saying that the guide rail 5 can be provided on the battery pack 2, or the guide groove 9 may be provided on the telephone main unit 1. Further, it is needless to say that the construction of the present invention can be applied on the abutment surface to be sealed of the portable electronic device having a removable unit other than the portable telephone.

As described above, the present invention provides a splashproof construction for a portable electronic device with a removable battery pack. It is a splashproof construction allowing evaporation and dispersion of the gas generated and suitable for the use of a battery pack of nickel-hydrogen battery.

What we claim are:

1. A splashproof construction for a portable electronic device comprising:

an electronic device main unit; and a battery pack to be mounted on the electronic device main unit, wherein one of the electronic device main unit or the battery pack includes a contact area and a guide rail disposed adjacent to the contact area, said contact area comprising a first surface formed along a peripheral edge of the electronic device main unit or the battery pack and a second surface which is elevated with respect to said first surface, and the other one of the electronic device main unit or the battery pack including a peripheral wall, a third surface disposed within said peripheral wall, and a guide groove slidably engagable with the guide rail, said peripheral wall being aligned with said first surface and said third surface being aligned with said second surface to define a splashproof seal when the battery pack is mounted on the electronic device main unit.

2. A splashproof construction for a portable electronic device according to claim 1, wherein the peripheral wall includes a notch which abuts on the first surface.

3. A splashproof construction for a portable electronic device according to claims 1 or 2 further comprising a water repellant sheet disposed within the guide groove.

4. A splashproof construction for a portable electronic device according to claim 1, wherein the battery pack comprises an elastic material disposed at one end of the battery pack, the one end being abutted against an abutment surface of the electronic device main unit when the battery pack is mounted on the electronic device main unit.

5. A splashproof construction for a portable electronic device according to claim 4, wherein the elastic material is tapered with respect to the abutment surface of the electronic device.

6. A splashproof construction for a portable electronic device according to claim 1 wherein the electronic device main unit comprises an elastic material disposed at one end of the electronic device main unit, the one end of the electronic device main unit being abutted against an abutment surface of the battery pack when the battery pack is mounted on the electronic device main unit.

7. A splashproof construction for a portable electronic device according to claim 6, wherein the elastic material is tapered with respect to the one end of the battery pack.

* * * * *